(No Model.)

W. CRAIN.
GRAIN SEPARATOR.

No. 282,705. Patented Aug. 7, 1883.

WITNESSES:
Thos Houghton.
Edw. A. Byrn.

INVENTOR:
William Crain
BY Munn & Co
ATTORNEYS.

UNITED STATES PATENT OFFICE.

WILLIAM CRAIN, OF CASTROVILLE, CALIFORNIA.

GRAIN-SEPARATOR.

SPECIFICATION forming part of Letters Patent No. 282,705, dated August 7, 1883.

Application filed May 12, 1883. (No model.)

*To all whom it may concern:*

Be it known that I, WILLIAM CRAIN, of Castroville, in the county of Monterey and State of California, have invented a new and useful Improvement in Grain-Separators; and I do hereby declare that the following is a full, clear, and exact description of the same, reference being had to the accompanying drawings, forming part of this specification, in which—

Figure 1:
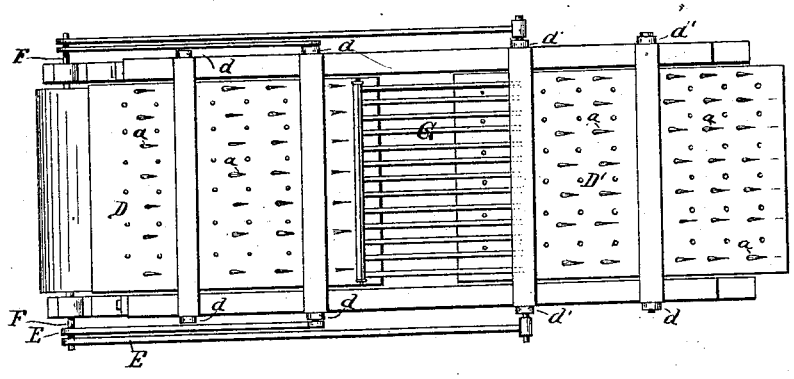
Figure 2:
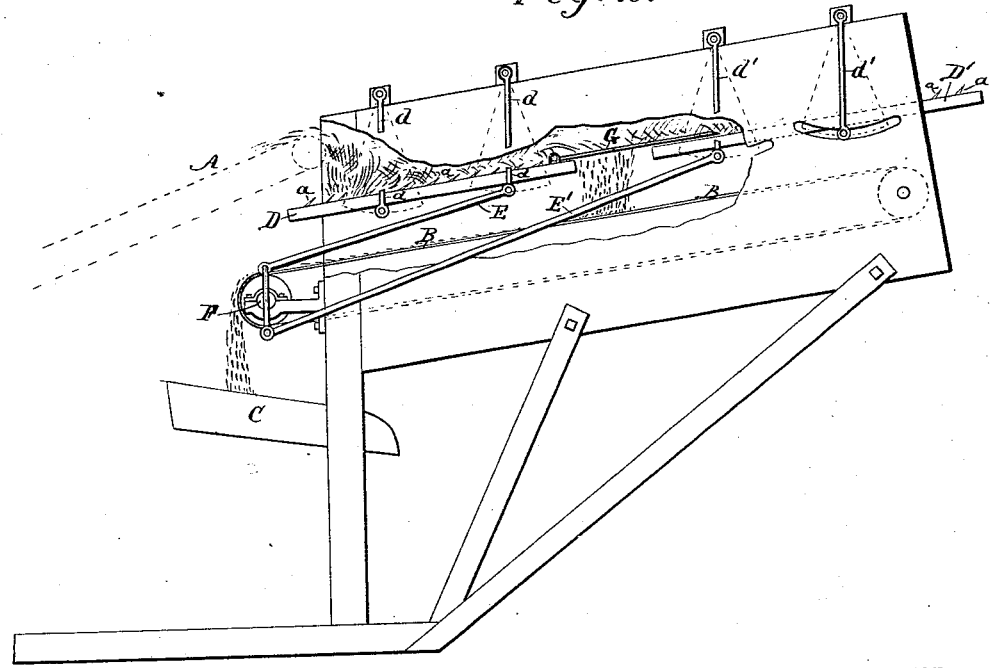

Figure 1 is a plan view; and Fig. 2 is a side elevation, partly broken away.

My invention relates to that part of a grain-separator which effects the first separation of the straw from the grain before the delivery of the grain and chaff to the shaking-shoe. This part of a grain-separator of this type has heretofore been made in the form of two oscillating screens or shakers arranged in different planes, and whose adjacent ends lap past each other, and which are geared to have opposite movements, moving alternately toward and away from each other—as shown, for instance, in the patent to Burlingame, July 29, 1862. In such case, however, the lapping of the two screens involves the following objections: First, that when the straw falls from the higher screen to the lower one, which laps under it, some of the separated grain will fall, on the back movement of the lower screen, on top of the straw and become commingled with it, so that it will not be separated therefrom. Another objection is that the location of one screen above the other and the lap makes the separator both longer and higher than need be, and involves a larger amount of material in its construction.

The object of my invention is to obviate these objections; and to this end it consists in a peculiar combination of parts, as will be hereinafter fully described, and pointed out in the claim.

In the drawings, A represents in dotted lines the lift-apron of a grain-separator, which raises the straw and commingled grain as they come from the thrashing-cylinder. B represents the grain-carrying apron, which catches the grain and chaff from the separator proper and carries them to the shaking-shoe C; and D D' is the grain-separator proper, which is in the nature of two screens, which are arranged in the same plane, and one of which, D, receives the commingled straw and grain from the elevator A, and the other of which discharges the straw at the rear end, and both of which are located above the grain-carrier B. One of these screens, D, is suspended upon arms $d\ d$ from pivotal supports above, and the other is suspended in a like manner upon arms $d'\ d'$. These screens are given an oscillatory motion about their point of suspension by means of the pitmen E E', which are so connected to cranks on the opposite sides of the center of a rotary shaft, F, as to impart a reversed motion to the two screens, causing them to alternately approach and recede from each other, which motion causes one screen to descend and move back, while the other rises and moves forward, thus securing a positive feed or shuffling of the straw to the rear end. This movement of the straw is facilitated and the straw also agitated by rearwardly-inclined teeth $a$.

In order to cause the straw to pass from the screen D to the other, D', in the same plane and still allow the grain to drop down between them, a rake, G, is attached to the forward screen, D, and its tines, which are about two inches apart, are allowed to project over to and on top of the rear screen, D', thus causing the proper separation of the grain, instead of allowing it to become mixed with the straw, as when the two screens lap and are arranged one above the other.

Having thus described my invention, what I claim as new is—

In a grain-separator, the two screens D D', arranged in the same plane at a distance from each other, and combined with suspending-arms $d\ d'$, the rake G, for continuing the passage of the straw from one to the other, and the reversely-geared pitmen E E', for giving opposite oscillatory movements to the screens, substantially as and for the purpose described.

WILLIAM CRAIN.

Witnesses:
WM. M. BERNARD,
EDWARD WRIGHT.